(12) United States Patent
Chung

(10) Patent No.: US 12,023,903 B2
(45) Date of Patent: Jul. 2, 2024

(54) METHOD FOR THINNING A FINGERPRINT IDENTIFICATION MODULE

(71) Applicants: Reco Technology (Chengdu) Co., Ltd, Chengdu (CN); Reco BioTek Co., Ltd, Toufen (TW)

(72) Inventor: Chin-Feng Chung, Toufen (TW)

(73) Assignees: RECO TECHNOLOGY CHENGDU CO., LTD, Chengdu (CN); RECO BIOTEK CO., LTD, Toufen (TW)

( * ) Notice: Subject to any disclaimer, the term of this patent is extended or adjusted under 35 U.S.C. 154(b) by 302 days.

(21) Appl. No.: 17/748,107

(22) Filed: May 19, 2022

(65) Prior Publication Data

US 2023/0321965 A1     Oct. 12, 2023

(30) Foreign Application Priority Data

Apr. 11, 2022   (CN) .......................... 202210374477.0

(51) Int. Cl.
*B32B 37/02*    (2006.01)
*B32B 37/12*    (2006.01)
(Continued)

(52) U.S. Cl.
CPC .............. *B32B 37/02* (2013.01); *B32B 37/12* (2013.01); *B32B 37/15* (2013.01); *B32B 37/24* (2013.01);
(Continued)

(58) Field of Classification Search
CPC ......... B32B 37/02; B32B 37/12; B32B 37/15; B32B 37/24; B32B 38/10; B32B 41/00;
(Continued)

(56) References Cited

U.S. PATENT DOCUMENTS

| 2012/0126229 A1* | 5/2012 | Bower ................ H01L 23/5389 |
| | | 257/E23.179 |
| 2020/0006241 A1* | 1/2020 | Wu ..................... H01L 21/6835 |

(Continued)

FOREIGN PATENT DOCUMENTS

CN         113035779 A      6/2021

*Primary Examiner* — Duy Vu N Deo
(74) *Attorney, Agent, or Firm* — Locke Lord LLP; Tim Tingkang Xia, Esq.

(57) ABSTRACT

A method for thinning a fingerprint identification module includes the steps of: providing at least one fingerprint identification module, wherein the fingerprint identification module includes a glass substrate and a plurality of laminated fingerprint identification members; providing a protective layer on each laminated fingerprint identification member; providing a dissociable sealant around each laminated fingerprint identification member and the protective layer of the fingerprint identification module and being adhered to support plate to form a carrier plate to be etched; etching the carrier plate to be etched and allowing an etching solution to etch the glass substrate until a thickness to be thinned is etched to form a semi-finished carrier plate; dissociating the dissociable sealant of the semi-finished carrier plate to reduce its viscosity; and removing the support plate, the dissociable sealant and the protective layer to complete a finished product of the thinned fingerprint identification module.

22 Claims, 7 Drawing Sheets

(51) Int. Cl.
  *B32B 37/15* (2006.01)
  *B32B 37/24* (2006.01)
  *B32B 38/10* (2006.01)
  *B32B 41/00* (2006.01)
  *B32B 43/00* (2006.01)
  *G06V 40/13* (2022.01)

(52) U.S. Cl.
  CPC .............. *B32B 38/10* (2013.01); *B32B 41/00* (2013.01); *B32B 43/006* (2013.01); *G06V 40/1329* (2022.01); *B32B 2037/243* (2013.01); *B32B 2309/105* (2013.01); *B32B 2310/0806* (2013.01); *B32B 2457/00* (2013.01)

(58) Field of Classification Search
  CPC ............ B32B 43/006; B32B 2037/243; B32B 2309/105; B32B 2310/0806; B32B 2457/00; G06V 40/1329; C03C 15/00; C03C 23/00; B08B 11/04
  USPC .......................................................... 216/37
  See application file for complete search history.

(56) References Cited

U.S. PATENT DOCUMENTS

2020/0335397 A1* 10/2020 Xiao ..................... H01L 21/561
2022/0037601 A1*  2/2022 Lee ...................... H10K 50/841

* cited by examiner

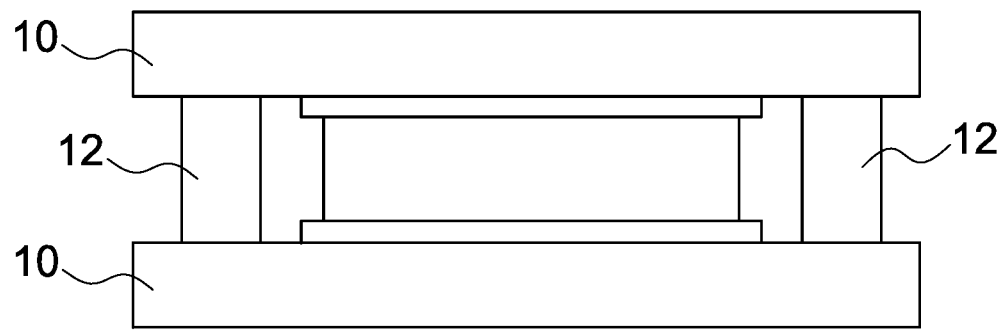
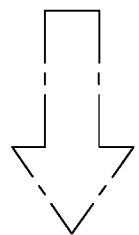
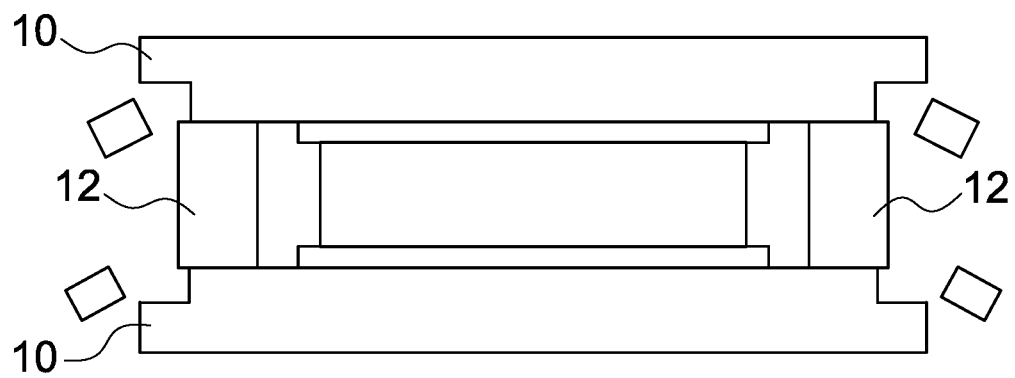
Fig. 3

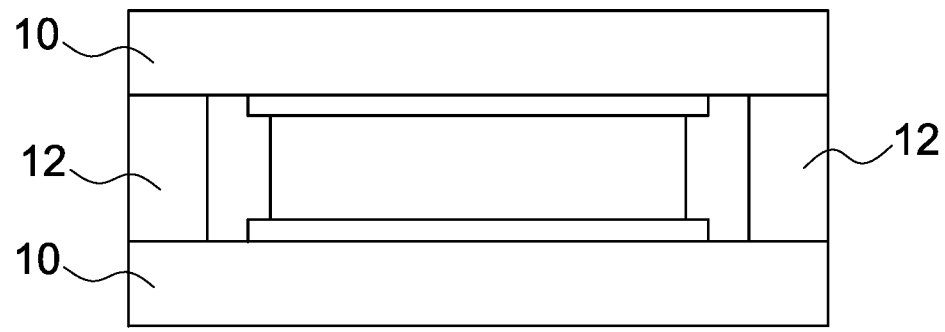
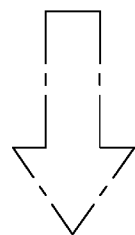
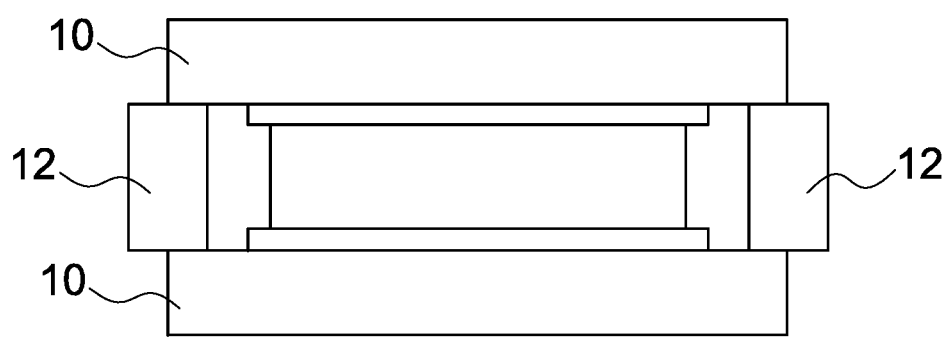
Fig. 4

METHOD FOR THINNING A FINGERPRINT IDENTIFICATION MODULE

CROSS-REFERENCE TO RELATED APPLICATIONS

This non-provisional application claims priority under 35 U.S.C. § 119(a) on Patent Application No(s). 202210374477.0 filed in China, on Apr. 11, 2022, the entire contents of which are hereby incorporated by reference.

FIELD OF THE INVENTION

The invention relates to a fingerprint identification module, and more specifically, to a method for thinning a glass substrate of a fingerprint identification module.

BACKGROUND OF THE INVENTION

With the development of science and technology and the upgrading demand of consumers, the demand for thin and light portable electronic devices is getting higher and higher. For portable electronic devices with traditional flat panel displays, the thickness of a single-layer glass substrate is generally 0.4 mm to 0.5 mm. The thickness of a liquid crystal cell composed of a double-layer glass substrate and a liquid crystal filling in the glass substrate is about 1.0 mm, which is difficult to meet the need for light and thin display devices. In order to meet light and thin requirements, manufacturers adopt the technology of thinning the glass substrate. The thickness of the display panel is reduced from 0.5 mm (or more) to 0.4 mm, 0.3 mm, 0.2 mm or even 0.1 mm, so as to achieve the purpose of lightweight and thinning. Further, after the glass substrate is thinned, it provides clearer and brighter image quality and reduces the space occupied. The space freed up can be used for other purposes, such as increasing battery capacity, and making the glass substrate more flexible for manufacturing curved displays.

The thinning technology of the glass substrate of the traditional liquid crystal cell may be a chemical etching thinning technology or a physical grinding thinning technology. The chemical etching thinning technology uses a chemical reaction between a liquid solution and a glass substrate to chemically etch the surface of the glass substrate, thereby reducing the thickness of the glass substrate. The physical grinding and thinning technology is to reduce the thickness of the glass substrate in a purely physical way by mechanical grinding on the glass substrate.

In addition, the thinning technology of traditional liquid crystal cells is also applied to traditional fingerprint identification components, which may be a single-layer thinning technology or a double-layer thinning technology. The single-layer thinning technology has the problem of low yield, resulting in poor economic benefits. The thinning technology needs a secondary acid-resistant film. The acid-resistant film is expensive and complicated. The double-layer thinning technology has the advantage of relatively large output compared with the single-layer process, and thus improves the economic efficiency and reduces the cost, but it has the following problems. A cutting process is required due to acid-resistant sealant. The cutting process will have the problems, such as uneven edges and poor quality, thus reducing the yield and increasing product costs.

China Patent Publication No. CN113035779A discloses a fingerprint identification component and a preparation method thereof and a terminal device, filed by the applicant. At least two laminated film structural members that are spaced apart from each other are provided on two glass substrates. A protective film is provided on each laminated film structural member of the glass substrate. A sealant is provided on one glass substrate. The sealant has a gap corresponding to the cutting position. The two glass substrates are laminated. The laminated film structural members of the two glass substrates are adjacent to each other through the protective films in a one-to-one correspondence manner. The two glass substrates are bonded by the sealant. The two glass substrates are thinned, respectively. The glass substrates are cut and separated to form a double-layer laminated component. The protective film is separated to obtain two fingerprint identification components.

Please refer to FIG. 1 and FIG. 2. FIG. 2 illustrates the step S41 of FIG. 9 of the foregoing patent. The rear first sealant 12 is not shown in FIG. 2. As described in the Step S41 in paragraph 0027 of the description of the foregoing patent, the first sealant 12 is disposed at the edges of the upper and lower glass substrates 10. A plurality of fingerprint identification modules 14 are disposed on the upper and lower glass substrates 10. A second sealant 16 is disposed around each fingerprint identification module 14 to separate the fingerprint identification modules 14. A gap is defined between the second sealant and each fingerprint identification module.

Please refer to FIG. 3. When the first sealant between the upper and lower glass substrates is slightly indented to the inner sides of the edges of the glass substrates, or there is no first sealant disposed between the upper and lower glass substrates, as the gap becomes larger, the etching solution of chemical thinning technology will etch the inner walls of the glass substrates. Please refer to FIG. 3. When the first sealant between the upper and lower glass substrates is flush with the edges of the glass substrates, or when there is no first sealant between the upper and lower glass substrates, but the second sealant is flush with the edges of the glass substrates, the etching solution of the chemical thinning technology will etch the edges of the glass substrates, so the size of each glass substrate is reduced inwardly.

Based on the above reasons, in order to allow the first sealant to have enough adhesion area on the glass substrates for the first sealant to connect the two glass substrates, the first sealant will extend beyond both sides of the glass substrate about 3 mm in width. However, the gap between the two glass substrates is about 100-150 um. With the increase of the thickness of the sealant, for the sealant, the upper and lower glass substrates will generate torsional moment and cause slip and fall off, which increases the difficulty of bonding. Furthermore, the larger the gap between the two glass substrates, the larger the area corresponding to the exposed sealant, which increases the difficulty of resisting acid.

In addition, the areas where the first sealant and the second sealant are applied will lead to the following problems for the subsequent cutting process:

First, the areas where the first sealant and the second sealant will be discarded after cutting, which means that the wider the areas where the first sealant and the second sealant are applied, the more waste will be generated, resulting in increased costs.

Second, the areas where the first sealant and the second sealant are applied will affect the starting point and ending point of the cutter wheel in the subsequent cutting process. Whether there is residual adhesive or foreign matter in the gap between the second sealant and the fingerprint identification module will affect the subsequent cutting yield.

Third, for cutting the glass substrate, there needs to be enough edge of the glass substrate, so the width of the sealant should not be too large. However, if the first sealant is too small, it will affect the adhesion area and the anti-acid effect.

To sum up, the size of the area where the first sealant or the second sealant is applied between the upper and lower glass substrates, that is, the height or width of the area where the first sealant or the second sealant is applied has a great influence on the cutting quality. Therefore, how to reduce the influence of the first sealant or the second sealant on the cutting quality is an urgent problem to be solved.

SUMMARY OF THE INVENTION

In view of the problems of the prior art, the primary object of the present invention is to improve the process of thinning a plurality of fingerprint identification components disposed on a large-sized glass substrate and to reduce the break of the glass substrate in the subsequent cutting process, thereby increasing productivity.

In order to achieve the above object, the present invention provides a method for thinning a fingerprint identification module, comprising the steps of: providing at least one fingerprint identification module, wherein the fingerprint identification module includes a thin film transistor (TFT) glass substrate (hereinafter referred to as the glass substrate) and a plurality of laminated fingerprint identification members, and each laminated fingerprint identification member is disposed on one side of the glass substrate; providing a protective layer on each laminated fingerprint identification member; providing a first dissociable sealant around each laminated fingerprint identification member and the protective layer of the fingerprint identification module to form a first intermediate, wherein the first dissociable sealant is separated from each laminated fingerprint identification member and the protective layer by a distance; adhering the first intermediate to a support plate using the first dissociable sealant, wherein each laminated fingerprint identification member and the protective layer are located between the glass substrate and the support plate; providing a second dissociable sealant around the first intermediate for an edge of the glass substrate to be exposed only by a thickness that needs to be thinned to form a carrier plate to be etched; etching the carrier plate to be etched and allowing an etching solution to etch the glass substrate until the thickness to be thinned is etched to form a semi-finished carrier plate; dissociating the first dissociable sealant and the second dissociable sealant of the semi-finished carrier plate to reduce their viscosity; and removing the support plate, the first dissociable sealant, the second dissociable sealant and the protective layer to complete a finished product of the thinned fingerprint identification module.

In order to achieve the above object, the present invention provides another method for thinning a fingerprint identification module, comprising the steps of: providing at least one fingerprint identification module, wherein the fingerprint identification module includes a thin film transistor (TFT) glass substrate (hereinafter referred to as the glass substrate) and a plurality of laminated fingerprint identification members, and each laminated fingerprint identification member is disposed on one side of the glass substrate; providing a protective layer on each laminated fingerprint identification member; providing a first dissociable sealant around each laminated fingerprint identification member and the protective layer of the fingerprint identification module to form a first intermediate, wherein the first dissociable sealant is separated from each laminated fingerprint identification member and the protective layer by a distance; adhering the first intermediate to both sides of a support plate using the first dissociable sealant, wherein each laminated fingerprint identification member and the protective layer of the fingerprint identification module are located between the glass substrate and the support plate; providing a second dissociable sealant around the first intermediate for an edge of the TFT glass substrate to be exposed only by a thickness that needs to be thinned to form a carrier plate to be etched; etching the carrier plate to be etched and allowing an etching solution to etch the glass substrate until the thickness to be thinned is etched to form a semi-finished carrier plate; dissociating the first dissociable sealant and the second dissociable sealant of the semi-finished carrier plate to reduce their viscosity; removing each glass substrate on one side of the support plate and the corresponding first dissociable sealant, the second dissociable sealant and the protective layer sequentially from one side of the support plate; and removing each glass substrate and the corresponding first dissociable sealant, the second dissociable sealant and the protective layer to complete a finished product of the thinned fingerprint identification module.

Preferably, before the protective layer is provided on the fingerprint identification module, the fingerprint identification module undergoes an incoming inspection, and the incoming inspection includes inspecting the glass substrate for residual foreign matter, inspecting the protective layer and the glass substrate for defects and measuring the thickness of the glass substrate to confirm whether the thickness to be etched subsequently needs to be adjusted or not.

Preferably, for providing the first dissociable sealant and the second dissociable sealant, a dispenser is provided to control the pressure and trajectory of a dispensing head, so as to control the amount and position of the first dissociable sealant and the second dissociable sealant. Preferably, the first dissociable sealant and the second dissociable sealant each have a width of 3±1 millimeters, and the first dissociable sealant and the second dissociable sealant cannot flow into the protective layer.

Preferably, after the etching solution etches the glass substrate until the thickness to be thinned is etched to form the semi-finished carrier plate, the semi-finished carrier plate is cleaned first.

Preferably, in the step of adhering the first intermediate to the support plate using the first dissociable sealant, the glass substrate is flat adhered to the support plate using the first dissociable sealant, so that the glass substrate and the support plate are kept at a same level.

Preferably, the first dissociable sealant and the second dissociable sealant are photocurable thermally-dissociable adhesives. After the glass substrate and the support plate are kept at a same level, the first dissociable sealant is illuminated by light for curing the first dissociable sealant, or when the second dissociable sealant is provided around the first intermediate, the second dissociable sealant is illuminated by light for curing the second dissociable sealant. When the first dissociable sealant or the second dissociable sealant on one side of the support plate is to be removed, the first dissociable sealant or the second dissociable sealant is heated to reduce its viscosity.

Preferably, when the first dissociable sealant and the second dissociable sealant are the photocurable thermally-dissociable adhesives and the first dissociable sealant or the second dissociable sealant on one side of the support plate is to be removed, the semi-finished carrier plate is immersed in hot water to dissociate the first dissociable sealant and the second dissociable sealant.

Preferably, the first dissociable sealant and the second dissociable sealant are thermally cured photodissociable adhesives. After the glass substrate and the support plate are kept at a same level, the first dissociable sealant is heated for curing the first dissociable sealant; or when the second dissociable sealant is provided around the first intermediate, the second dissociable sealant is heated for curing the second dissociable sealant. When the first dissociable sealant or the second dissociable sealant on one side of the support plate is to be removed, the first dissociable sealant or the second dissociable sealant is illuminated by light to reduce its viscosity.

Preferably, a retaining carrier is provided for carrying and retaining a plurality of carrier plates to be etched, so that the carrier plates to be etched will not move and collide during the etching process, so as to prevent the glass substrate from being broken.

Preferably, the finished product of the thinned fingerprint identification module is inspected, including inspecting whether a surface of the finished product of the thinned fingerprint identification module has scratches or slip marks and measuring the thickness of the glass substrate.

To sum up, in the present invention, the support plate is configured to give the glass substrate an appropriate support force, so that the glass substrate is not easily damaged after being thinned. Moreover, there is no need for edge strips, spacer strips and supplementary strips between the fingerprint identification modules, as described in the foregoing patent, as long as the first dissociable sealant or the second dissociable sealant is disposed between the glass substrate and the support plate. If the first dissociable sealant is able to isolate the fingerprint identification modules and cover the part that does not need to be etched of the glass substrate, and only the thickness to be thinned of the glass substrate is exposed, the above step of providing the second dissociable sealant can be omitted. Moreover, the present invention does not cut the glass substrate after the semi-finished carrier plate is completed, but the first dissociable sealant or the second dissociable sealant is removed. All the glass substrates of the finished product of the fingerprint identification modules still have the plurality of laminated fingerprint identification members.

BRIEF DESCRIPTION OF THE DRAWINGS

FIG. 3 is a schematic view showing that the inner wall of a conventional glass substrate is etched;

FIG. 4 is a schematic view showing that the conventional glass substrate is reduced inwardly;

DETAILED DESCRIPTION OF THE PREFERRED EMBODIMENTS

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

It will be understood that when an element is referred to as being "fixed to," or "disposed on" another element, it may be directly on the other element or one intervening element may be present. When an element is referred to as being "connected to" another element, it may be directly connected to the other element, or one intervening element may be present. Spatially relative terms, such as "vertical," "horizontal," "upper," "lower," "left," "right," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures.

In addition, the terms "first" and "second" are only used for descriptive purposes, and should not be construed as indicating or implying relative importance or implying the number of indicated technical features. Thus, a feature delimited with "first", "second" may expressly or implicitly include at least one of the features. In the description of the present invention, "multiple," "a plurality of" means at least two, such as two, three, etc., unless otherwise expressly and specifically defined.

In the present invention, unless otherwise expressly specified and limited, the first feature "on" or "beneath" the second feature may be that the first feature directly contacts the second feature, or the first feature and the second feature indirectly contact through an intermediary. In addition, the first feature being "above", "over" and "on" the second feature means that the first feature is directly above or obliquely above the second feature, or simply means that the first feature is higher than the second feature. The first feature being "above", "over" and "on" the second feature means that the first feature is directly below or diagonally below the second feature, or simply means that the level of the first feature is less than that of the second feature.

Unless otherwise defined, all technical and scientific terms used in the description of the present invention have the same meaning as commonly understood by a person skilled in the technical field of the present invention. The terms used in the description of the present invention are for the purpose of describing specific embodiments only, and are not intended to limit the present invention. The term "and/or" used in this specification includes any one or a combination of the associated listed items.

Figure 1:
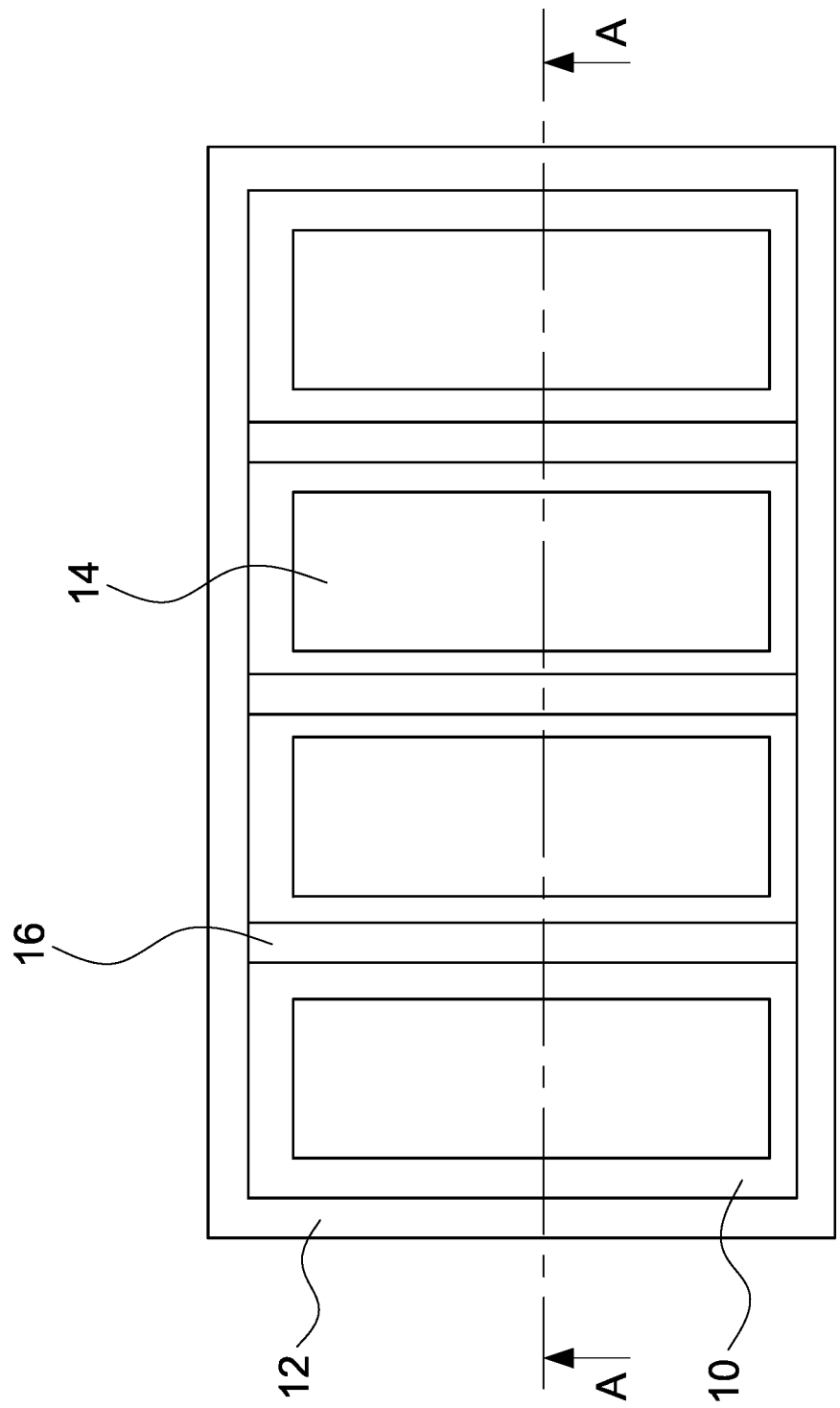
FIG. 1 is a top view of step S41 in FIG. 9 of China Patent Publication No. CN113035779A.
Figure 2:
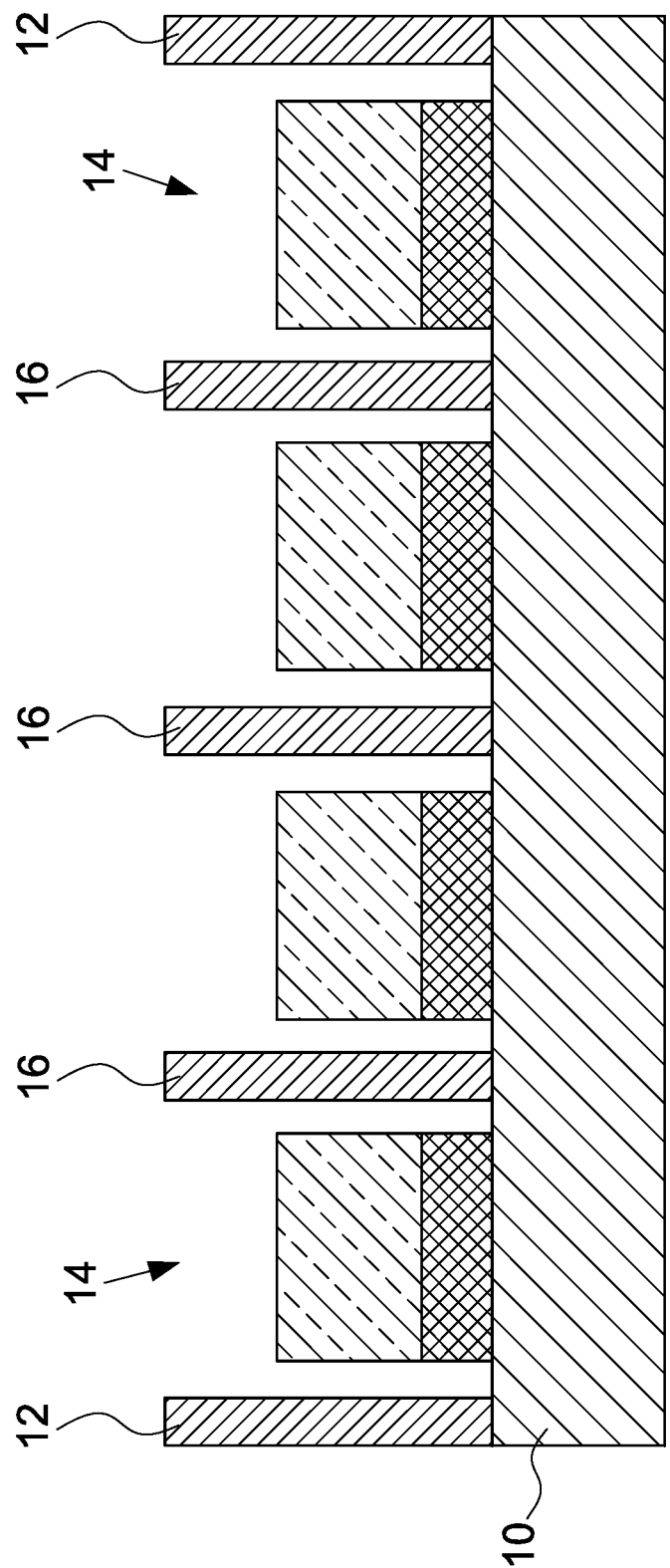
FIG. 2 is a cross-sectional view taken along line A-A of FIG. 1.
Figure 5:
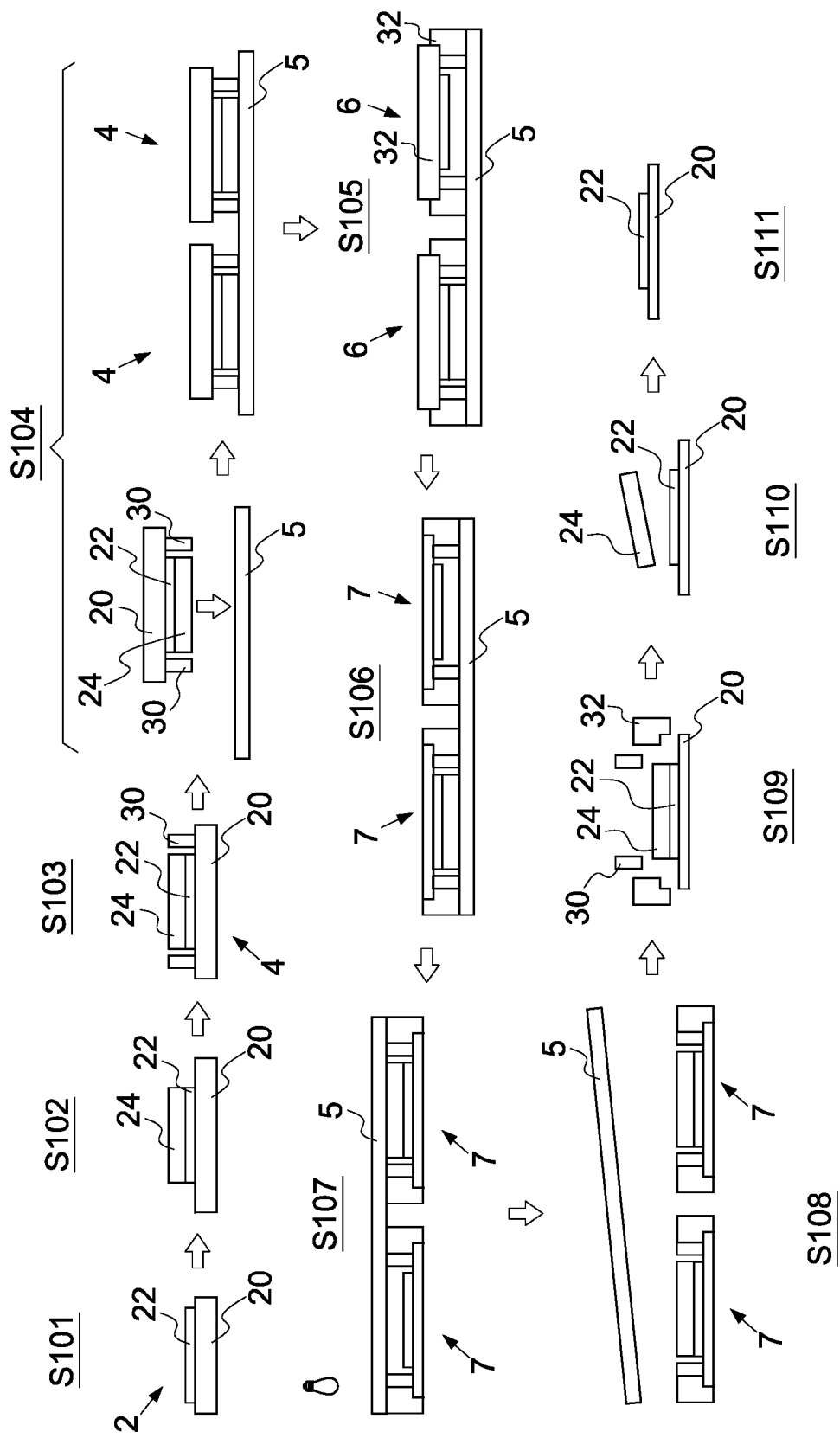
FIG. 5 is a schematic view of a manufacturing process according to an embodiment of the present invention.
Figure 6:
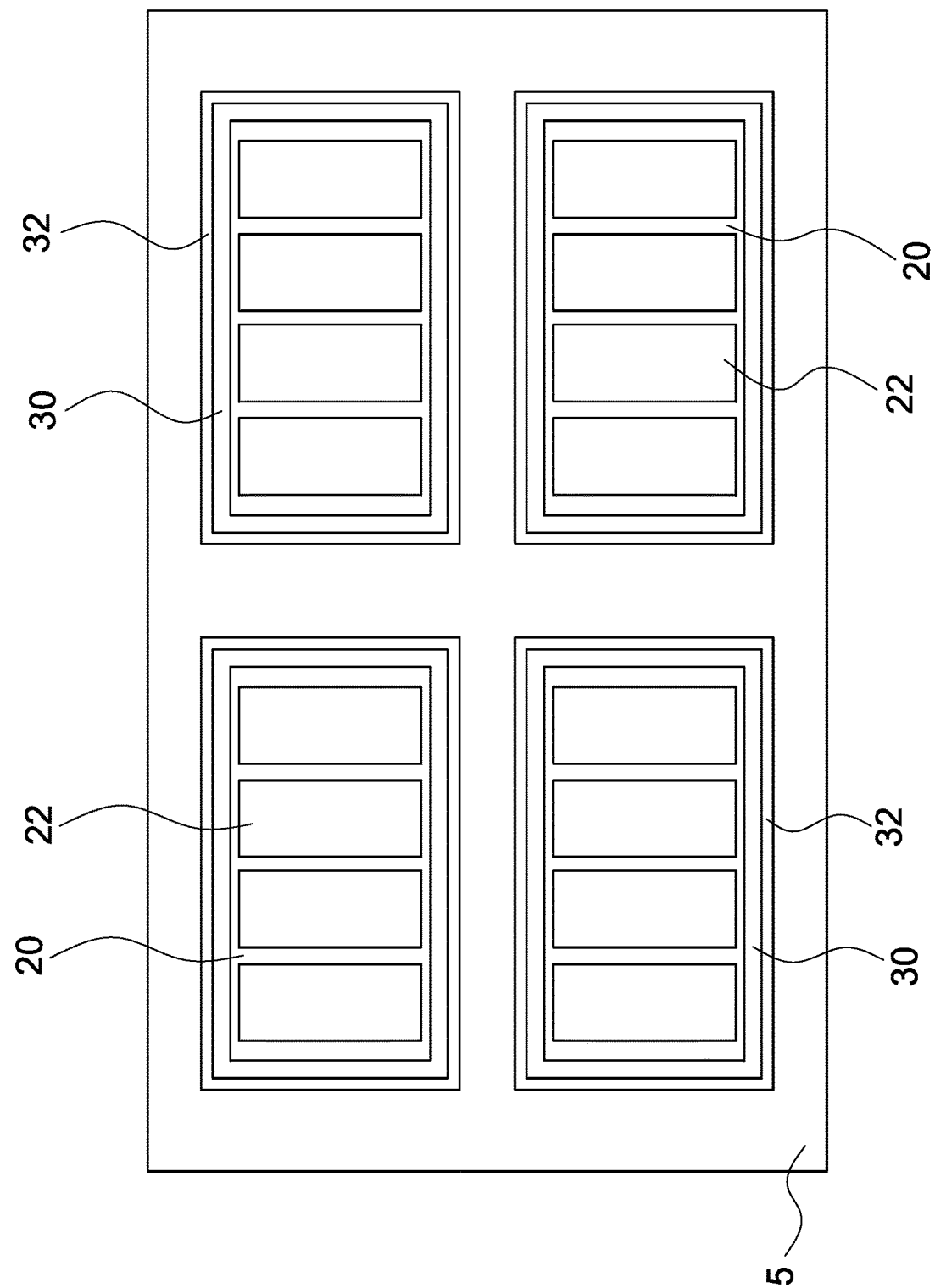
FIG. 6 is a top view of the carrier plate to be etched in step S105 of the present invention.

As shown in FIG. 5 and FIG. 6, the present invention provides a method for thinning a fingerprint identification module, comprising the steps of:

(S101) providing at least one fingerprint identification module 2, wherein the fingerprint identification module 2 includes a glass substrate 20 and a plurality of laminated fingerprint identification members 22, the glass substrate 20 is a thin film transistor (TFT) glass substrate, each laminated fingerprint identification member 22 is disposed on one side of the glass substrate 20, in the present invention, the laminated fingerprint identification members 22 are arranged on the glass substrate 20 in an array manner, each laminated fingerprint identification member 22 includes an adhesive layer, a piezoelectric layer, a conductive layer and a barrier layer that are laminated in sequence, and the adhesive layer is attached to the glass substrate 20;

(S102) providing a protective layer 24 on each laminated fingerprint identification member 22;

(S103) providing a first dissociable sealant 30 around each laminated fingerprint identification member 22 and the protective layer 24 of the fingerprint identification module 2 to form a first intermediate 4, wherein the first dissociable sealant 30 is separated from each laminated fingerprint identification member 22 and the protective layer 24 by a distance;

(S104) adhering the first intermediate 4 to a support plate 5 using the first dissociable sealant 30, wherein each laminated fingerprint identification member 22 and the protective layer 24 are located between the glass substrate 20 and the support plate 5;

(S105) providing a second dissociable sealant 32 around the first intermediate 4 for the edge of the TFT glass substrate 20 to be exposed only by a thickness that needs to be thinned to form a carrier plate 6 to be etched (as shown in FIG. 60, such that the glass substrate 20 won't have the problem that the glass substrate 10 is reduced inwardly after being etched as shown in FIG. 3;

(S106) etching the carrier plate 6 to be etched and allowing an etching solution to etch the TFT glass substrate 20 until the thickness to be thinned is etched to form a semi-finished carrier plate 7;

(S107) dissociating the first dissociable sealant 30 and the second dissociable sealant 32 of the semi-finished carrier plate 7 to reduce their viscosity;

(S108) removing the support plate 5;

(S109) removing the first dissociable sealant 30 and the second dissociable sealant 32;

(S110) removing the protective layer 24; and (S111) completing a finished product of the thinned fingerprint identification module.

Figure 7:
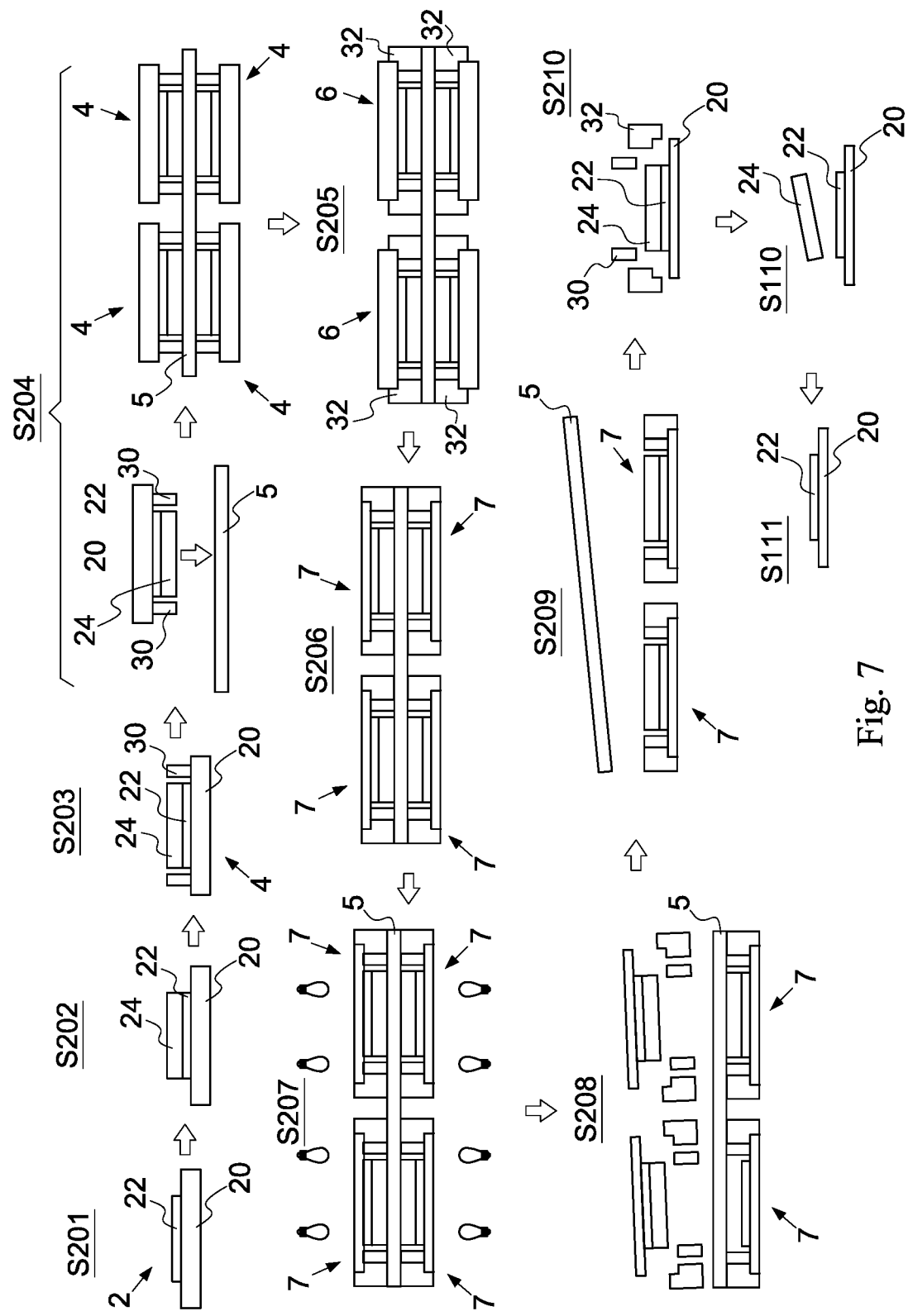
FIG. 7 is a schematic view of a manufacturing process according to another embodiment of the present invention.

As shown in FIG. 7, the present invention provides another method for thinning a fingerprint identification module, comprising the steps of:

(S201) providing at least one fingerprint identification module 2, wherein the fingerprint identification module 2 includes a glass substrate 20 and a plurality of laminated fingerprint identification members 22, the glass substrate 20 is a thin film transistor (TFT) glass substrate, each laminated fingerprint identification member 22 is disposed on one side of the glass substrate 20, in the present invention, the laminated fingerprint identification members 22 are arranged on the glass substrate 20 in an array manner;

(S202) providing a protective layer 24 on each laminated fingerprint identification member 22;

(S203) providing a first dissociable sealant 30 around each laminated fingerprint identification member 22 and the protective layer 24 of the fingerprint identification module 2 to form a first intermediate 4, wherein the first dissociable sealant 30 is separated from each laminated fingerprint identification member 22 and the protective layer 24 by a distance;

(S204) adhering the first intermediate 4 to both sides of a support plate 5 using the first dissociable sealant 30, wherein each laminated fingerprint identification member 22 and the protective layer 24 of the fingerprint identification module 2 are located between the glass substrate 20 and the support plate 5, a plurality of fingerprint identification modules 2 are provided on both sides of the support plate 5, the laminated fingerprint identification members 22 of each fingerprint identification module 2 are arranged on the respective glass substrate 20 in an array manner;

(S205) providing a second dissociable sealant 32 around the first intermediate 4 for the edge of each TFT glass substrate 20 to be exposed only by a thickness that needs to be thinned to form a carrier plate 6 to be etched;

(S206) etching the carrier plate 6 and allowing an etching solution to etch the TFT glass substrate 20 until the thickness to be thinned is etched to form a semi-finished carrier plate 7;

(S207) dissociating the first dissociable sealant 30 and the second dissociable sealant 32 of the semi-finished carrier plate 7 to reduce their viscosity;

(S208) removing each glass substrate 20 on one side of the support plate 5 and the corresponding first dissociable sealant 30, the second dissociable sealant 32 and the protective layer 24 sequentially from one side of the support plate 5;

(S209) removing the support plate 5;

(S210) removing each glass substrate 20 and its corresponding first dissociable sealant 30 and the second dissociable sealant 32;

(S211) removing the protective layer 24; and (S212) completing a finished product of the thinned fingerprint identification module.

In order to ensure that in the process of thinning the fingerprint identification module 2, defective products of the fingerprint identification module 2 won't be used and the yield in the manufacturing is improved, in the present invention, before the protective layer 24 is provided on the fingerprint identification module 2, the fingerprint identification module 2 undergoes an incoming inspection. The incoming inspection includes inspecting the glass substrate 20 for residual foreign matter, inspecting the protective layer 24 and the glass substrate 20 for defects and measuring the thickness of the glass substrate 20 to confirm whether the thickness to be etched subsequently needs to be adjusted or not.

In the present invention, for providing the first dissociable sealant 30 around each laminated fingerprint identification member 22 and the protective layer 24 and for providing the second dissociable sealant 32 around the first intermediate 4, a dispenser is provided to control the pressure and trajectory of a dispensing head, so as to control the amount and position of the first dissociable sealant 30 and the second dissociable sealant 32. The width of the first dissociable sealant 30 and the second dissociable sealant 32 is 3±1 millimeters (mm), and the first dissociable sealant 30 and the second dissociable sealant 32 cannot flow into the protective layer 24.

It should be noted that when the first dissociable sealant 30 is disposed around each laminated fingerprint identification member 22 and the protective layer 24, the first intermediate 4 is adhered to the support plate 5 using the first dissociable sealant 30. If the first dissociable sealant 30 acts as the second dissociable sealant 32 for the TFT glass substrates 20 to be exposed only by the thickness to be thinned to form the carrier plate 6 to be etched, the above step of providing the second dissociable sealant 32 can be omitted.

In the present invention, after the etching solution etches the TFT glass substrate 20 until the thickness to be thinned is etched to form the semi-finished carrier plate 7, the semi-finished carrier plate 7 is cleaned first. In the step of adhering the first intermediate 4 to the support plate 5 using the first dissociable sealant 30, the glass substrate 20 is flat adhered to the support plate 5 using the first dissociable sealant 30, so that the glass substrate 20 and the support plate 5 are kept at the same level.

In the present invention, the first dissociable sealant 30 and the second dissociable sealant 32 are photocurable thermally-dissociable adhesives. After the glass substrate 20 and the support plate 5 are kept at the same level, the first dissociable sealant 30 is illuminated by light for curing the first dissociable sealant, or when the second dissociable sealant 32 is provided around the first intermediate 4, the second dissociable sealant 32 is illuminated by light for curing the second dissociable sealant. When the first dissociable sealant 30 or the second dissociable sealant 32 on one side of the support plate 5 is to be removed, the first dissociable sealant 30 or the second dissociable sealant 32 is heated to reduce its viscosity. When the first dissociable sealant 30 and the second dissociable sealant 32 are photocurable thermally-dissociable adhesives and the first dissociable sealant 30 or the second dissociable sealant 32 on one side of the support plate 5 is to be removed, the semi-finished carrier plate 7 is immersed in hot water to dissociate the first dissociable sealant 30 and the second dissociable sealant 32.

In the present invention, the first dissociable sealant 30 and the second dissociable sealant 32 are thermally cured photodissociable adhesives. After the glass substrate 20 and the support plate 5 are kept at the same level, the first dissociable sealant 30 is heated for curing the first dissociable sealant; or, when the second dissociable sealant 32 is provided around the first intermediate 4, the second dissociable sealant 32 is heated for curing the second dissociable sealant. When the first dissociable sealant 30 or the second dissociable sealant 32 on one side of the support plate 5 is to be removed, the first dissociable sealant 30 or the second dissociable sealant 32 is illuminated by light to reduce its viscosity.

In the present invention, after the carrier plate 6 to be etched is completed, a retaining carrier is provided for carrying and retaining a plurality of carrier plates 6 to be etched, so that the carrier plates 6 to be etched will not move and collide during the etching process, so as to prevent the glass substrate 20 from being broken. Furthermore, after the finished product of the thinned fingerprint identification module is completed, the finished product is inspected. The inspection includes inspecting whether the surface of the finished product of the thinned fingerprint identification module has scratches, slip marks and poor etching, and measuring the thickness of the glass substrate 20 to ensure that the thinned thickness of the product meets the specification requirements.

To sum up, in the present invention, the support plate 5 is configured to give the glass substrate 20 an appropriate support force, so that the glass substrate 20 is not easily damaged after being thinned. Moreover, there is no need for edge strips, spacer strips and supplementary strips between the fingerprint identification modules 2, as described in the foregoing patent, as long as the first dissociable sealant 30 or the second dissociable sealant 32 is disposed between the glass substrate 20 and the support plate 5. If the first dissociable sealant 30 is able to isolate the fingerprint identification modules 2 and cover the part that does not need to be etched of the glass substrate 20, and only the thickness to be thinned of the glass substrate 20 is exposed, the above step of providing the second dissociable sealant 32 can be omitted. Moreover, the present invention does not cut the glass substrate after the semi-finished carrier plate 7 is completed, but the first dissociable sealant 30 or the second dissociable sealant 32 is removed. All the glass substrates 20 of the finished product of the fingerprint identification modules still have the plurality of laminated fingerprint identification members 22. The present invention does not include the manufacturing process of cutting the glass substrate 20 of the finished product of the fingerprint identification module along the laminated fingerprint identification members 22.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for thinning a fingerprint identification module, comprising the steps of:
    providing at least one fingerprint identification module, wherein the fingerprint identification module includes a glass substrate and a plurality of laminated fingerprint identification members, and each laminated fingerprint identification member is disposed on one side of the glass substrate;
    providing a protective layer on each laminated fingerprint identification member;
    providing a first dissociable sealant around each laminated fingerprint identification member and the protective layer of the fingerprint identification module to form a first intermediate, wherein the first dissociable sealant is separated from each laminated fingerprint identification member and the protective layer by a distance;
    adhering the first intermediate to a support plate using the first dissociable sealant, wherein each laminated fingerprint identification member and the protective layer are located between the glass substrate and the support plate;
    providing a second dissociable sealant around the first intermediate for an edge of the glass substrate to be exposed only by a thickness that needs to be thinned to form a carrier plate to be etched;
    etching the carrier plate to be etched and allowing an etching solution to etch the glass substrate until the thickness to be thinned is etched to form a semi-finished carrier plate;
    dissociating the first dissociable sealant and the second dissociable sealant of the semi-finished carrier plate to reduce their viscosity; and
    removing the support plate, the first dissociable sealant, the second dissociable sealant and the protective layer 24 to complete a finished product of the thinned fingerprint identification module.

2. The method as claimed in claim 1, wherein before the protective layer is provided on the fingerprint identification module, the fingerprint identification module undergoes an incoming inspection, and the incoming inspection includes inspecting the glass substrate for residual foreign matter, inspecting the protective layer and the glass substrate for defects and measuring the thickness of the glass substrate to confirm whether the thickness to be etched subsequently needs to be adjusted or not.

3. The method as claimed in claim 1, wherein for providing the first dissociable sealant and the second dissociable sealant, a dispenser is provided to control the pressure and trajectory of a dispensing head, so as to control the amount and position of the first dissociable sealant and the second dissociable sealant.

4. The method as claimed in claim 1, wherein the first dissociable sealant and the second dissociable sealant each have a width of 3±1 millimeters, and the first dissociable sealant and the second dissociable sealant cannot flow into the protective layer.

5. The method as claimed in claim 1, wherein after the etching solution etches the glass substrate until the thickness to be thinned is etched to form the semi-finished carrier plate, the semi-finished carrier plate is cleaned first.

6. The method as claimed in claim 1, wherein in the step of adhering the first intermediate to the support plate using the first dissociable sealant, the glass substrate is flat adhered to the support plate using the first dissociable sealant, so that the glass substrate and the support plate are kept at a same level.

7. The method as claimed in claim 1, wherein the first dissociable sealant and the second dissociable sealant are photocurable thermally-dissociable adhesives, after the glass substrate and the support plate are kept at a same level, the first dissociable sealant is illuminated by light for curing the first dissociable sealant, or when the second dissociable sealant is provided around the first intermediate, the second dissociable sealant is illuminated by light for curing the second dissociable sealant, when the first dissociable sealant or the second dissociable sealant on the support plate is to be removed, the first dissociable sealant or the second dissociable sealant is heated to reduce its viscosity.

8. The method as claimed in claim 7, wherein when the first dissociable sealant and the second dissociable sealant are the photocurable thermally-dissociable adhesives and the first dissociable sealant or the second dissociable sealant on the support plate is to be removed, the semi-finished carrier plate is immersed in hot water to dissociate the first dissociable sealant and the second dissociable sealant.

9. The method as claimed in claim 1, wherein the first dissociable sealant and the second dissociable sealant are thermally cured photodissociable adhesives, after the glass substrate and the support plate are kept at a same level, the first dissociable sealant is heated for curing the first dissociable sealant; or when the second dissociable sealant is provided around the first intermediate, the second dissociable sealant is heated for curing the second dissociable sealant, when the first dissociable sealant or the second dissociable sealant on the support plate is to be removed, the first dissociable sealant or the second dissociable sealant is illuminated by light to reduce its viscosity.

10. The method as claimed in claim 1, wherein after the step of forming the carrier plate to be etched, a retaining carrier is provided for carrying and retaining a plurality of carrier plates to be etched together.

11. The method as claimed in claim 1, wherein after the finished product of the thinned fingerprint identification module is completed, the finished product is inspected, including inspecting whether a surface of the finished product of the thinned fingerprint identification module has scratches or slip marks and measuring the thickness of the glass substrate.

12. A method for thinning a fingerprint identification module, comprising the steps of:
providing at least one fingerprint identification module, wherein the fingerprint identification module includes a glass substrate and a plurality of laminated fingerprint identification members, and each laminated fingerprint identification member is disposed on one side of the glass substrate;
providing a protective layer on each laminated fingerprint identification member;
providing a first dissociable sealant around each laminated fingerprint identification member and the protective layer of the fingerprint identification module to form a first intermediate, wherein the first dissociable sealant is separated from each laminated fingerprint identification member and the protective layer by a distance;
adhering the first intermediate to both sides of a support plate using the first dissociable sealant, wherein each laminated fingerprint identification member and the protective layer of the fingerprint identification module are located between the glass substrate and the support plate;
providing a second dissociable sealant around the first intermediate for an edge of the glass substrate to be exposed only by a thickness that needs to be thinned to form a carrier plate to be etched;
etching the carrier plate to be etched and allowing an etching solution to etch the glass substrate until the thickness to be thinned is etched to form a semi-finished carrier plate;
dissociating the first dissociable sealant and the second dissociable sealant of the semi-finished carrier plate to reduce their viscosity;
removing each glass substrate on one side of the support plate and the corresponding first dissociable sealant, the second dissociable sealant and the protective layer sequentially from one side of the support plate; and
removing each glass substrate and the corresponding first dissociable sealant, the second dissociable sealant and the protective layer to complete a finished product of the thinned fingerprint identification module.

13. The method as claimed in claim 12, wherein before the protective layer is provided on the fingerprint identification module, the fingerprint identification module undergoes an incoming inspection, and the incoming inspection includes inspecting the glass substrate for residual foreign matter, inspecting the protective layer and the glass substrate for defects and measuring the thickness of the glass substrate.

14. The method as claimed in claim 12, wherein for providing the first dissociable sealant and the second dissociable sealant, a dispenser is provided to control the pressure and trajectory of a dispensing head, so as to control the amount and position of the first dissociable sealant and the second dissociable sealant.

15. The method as claimed in claim 12, wherein the first dissociable sealant and the second dissociable sealant each have a width of 3±1 millimeters, and the first dissociable sealant and the second dissociable sealant cannot flow into the protective layer.

16. The method as claimed in claim 12, wherein after the etching solution etches the glass substrate until the thickness to be thinned is etched to form the semi-finished carrier plate, the semi-finished carrier plate is cleaned first.

17. The method as claimed in claim 12, wherein in the step of adhering the first intermediate to the support plate using the first dissociable sealant, the glass substrate is flat adhered to the support plate using the first dissociable sealant, so that the glass substrate and the support plate are kept at a same level.

18. The method as claimed in claim 12, wherein the first dissociable sealant and the second dissociable sealant are photocurable thermally-dissociable adhesives, after the glass substrate and the support plate are kept at a same level, the first dissociable sealant is illuminated by light for curing the first dissociable sealant, or when the second dissociable sealant is provided around the first intermediate, the second dissociable sealant is illuminated by light for curing the second dissociable sealant, when the first dissociable sealant or the second dissociable sealant on one side of the support plate is to be removed, the first dissociable sealant or the second dissociable sealant is heated to reduce its viscosity.

19. The method as claimed in claim 18, wherein when the first dissociable sealant and the second dissociable sealant are the photocurable thermally-dissociable adhesives and the first dissociable sealant or the second dissociable sealant on one side of the support plate is to be removed, the semi-finished carrier plate is immersed in hot water to dissociate the first dissociable sealant and the second dissociable sealant.

20. The method as claimed in claim 12, wherein the first dissociable sealant and the second dissociable sealant are thermally cured photodissociable adhesives, after the glass substrate and the support plate are kept at a same level, the first dissociable sealant is heated for curing the first dissociable sealant; or when the second dissociable sealant is provided around the first intermediate, the second dissociable sealant is heated for curing the second dissociable sealant, when the first dissociable sealant or the second dissociable sealant on the support plate is to be removed, the first dissociable sealant or the second dissociable sealant is illuminated by light to reduce its viscosity.

21. The method as claimed in claim 12, wherein after the step of forming the carrier plate to be etched, a retaining carrier is provided for carrying and retaining a plurality of carrier plates to be etched together.

22. The method as claimed in claim 12, wherein after the finished product of the thinned fingerprint identification module is completed, the finished product is inspected, including inspecting whether a surface of the finished product of the thinned fingerprint identification module has scratches or slip marks and measuring the thickness of the glass substrate.

* * * * *